(12) United States Patent
Deierling

(10) Patent No.: US 6,243,129 B1
(45) Date of Patent: Jun. 5, 2001

(54) SYSTEM AND METHOD FOR VIDEOCONFERENCING AND SIMULTANEOUSLY VIEWING A SUPPLEMENTAL VIDEO SOURCE

(75) Inventor: Kevin Deierling, Los Altos Hills, CA (US)

(73) Assignee: 8×8, Inc., Santa Clara, CA (US)

( * ) Notice: Subject to any disclaimer, the term of this patent is extended or adjusted under 35 U.S.C. 154(b) by 0 days.

(21) Appl. No.: 09/005,235

(22) Filed: Jan. 9, 1998

(51) Int. Cl.$^7$ ....................................................... H04N 7/14
(52) U.S. Cl. ............................ 348/15; 348/14; 379/93.17
(58) Field of Search ................... 348/14, 15, 16; 370/260; 379/93.17; H04N 7/14

(56) References Cited

U.S. PATENT DOCUMENTS

| 5,379,351 | 1/1995 | Fandrianto et al. . | |
|---|---|---|---|
| 5,594,813 | 1/1997 | Fandrianto et al. . | |
| 5,606,554 | * 2/1997 | Shiibata et al. ........................ | 348/15 |
| 5,926,208 | * 7/1999 | Noonen et al. ........................ | 348/15 |

FOREIGN PATENT DOCUMENTS

| 403229588A | * 10/1991 | (JP) | ................................. H04N/7/14 |
|---|---|---|---|
| 407023357A | * 1/1995 | (JP) | ................................. H04N/7/14 |
| 9-149333 | * 6/1997 | (JP) | ................................. H04N/7/14 |

OTHER PUBLICATIONS

U.S. application No. 08/941,975, Barraclough et al. filed Oct. 1, 1997.

* cited by examiner

*Primary Examiner*—Curtis A. Kuntz
*Assistant Examiner*—Melur Ramakrishnaiah

(57) ABSTRACT

A videoconferencing arrangement that selectively creates a composite arrangement of videoconferencing data along with video data from a supplemental video source. In one embodiment, a first analog-to-digital converter provides digital videoconferencing data from a camera source, and a second analog-to-digital converter is arranged to provide digital video data from a supplemental analog video signal source, such as a broadcast television signal. Digital video signals from a remote videoconferencing arrangement are decompressed and provided as input, along with the video data from the camera and supplemental video data, to a video processor. Responsive to selection signals, the video processor scales selected video data and overlays the scaled video data on selected other video data. For example, a live television broadcast can be overlaid with remote videoconferencing data.

6 Claims, 11 Drawing Sheets

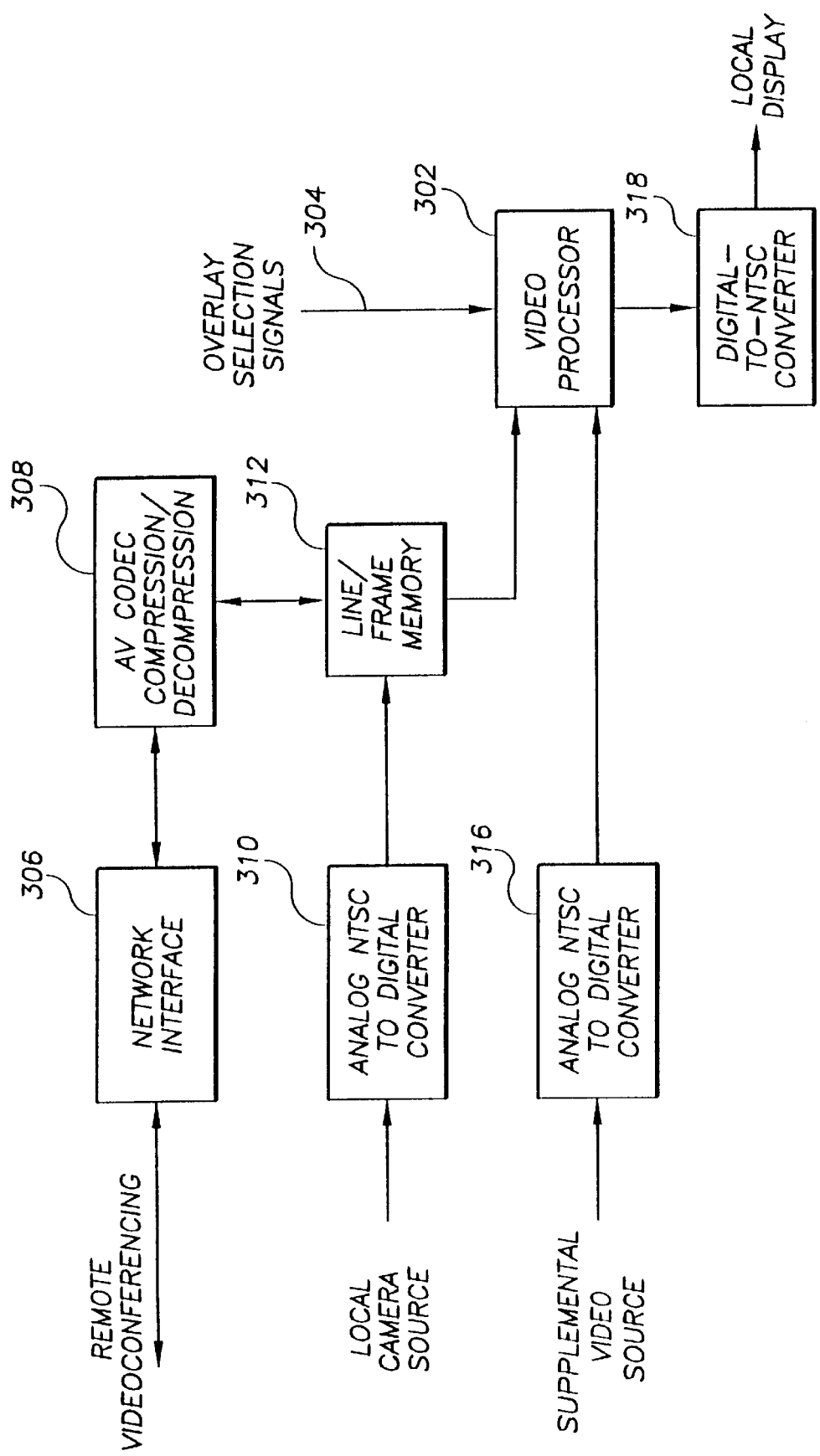

SYSTEM AND METHOD FOR VIDEOCONFERENCING AND SIMULTANEOUSLY VIEWING A SUPPLEMENTAL VIDEO SOURCE

RELATED APPLICATION

The present application is related to, and fully incorporates the teachings of U.S. patent application Ser. No. 08/941,975, filed on Oct. 1, 1997, entitled "VIDEOCONFERENCING ARRANGEMENT HAVING MULTI-PURPOSE DIGITAL STILL CAMERA" and commonly assigned to the assignee of the present invention.

FIELD OF THE INVENTION

The present invention generally relates to videoconferencing arrangements, and more particularly, to a system and method for simultaneous viewing videoconferencing data along with video data from a supplemental video source.

BACKGROUND OF THE INVENTION

Video communication systems have become increasingly popular. Videoconferencing, for example, is becoming more common in both business and residential applications. Videoconferencing permits audio as well as visual live communication between two remotely located terminals communicating over a single channel. Videoconferencing has had limited success due to, for example, unavailability of a common network interface, overly complex controls, poor video quality, limited functionality, inconvenience, and high cost.

Various levels of coordination are required for videoconferencing with today's systems. For personal computer based applications, the parties must agree upon a time to videoconference so that their computers are running and available to establish the necessary connection. For an impromptu video conference, one party must first contact the other party, by telephone for example, and the parties must then establish the necessary communications between their computers. Thus, the necessary orchestration to establish a video conference does not promote videoconferencing as a preferred communication medium.

Today's videoconferencing set-top boxes are commonly arranged for usage with conventional televisions and telephones. They require interruption of normal television viewing, e.g., broadcast television or CATV, to conduct a videoconference. That is, it is only the videoconference that is displayed on the television. Therefore, impromptu videoconferencing during a popular broadcast, such as a sporting event, a pay-per-view movie, or even a popular sitcom, is unlikely, even though possibly desirable.

Ideally, videoconferencing systems should be convenient to use. Furthermore, users should not have to choose between videoconferencing and watching a television program. Therefore, it would be desirable for a videoconferencing arrangement to address the problems described above.

SUMMARY OF THE INVENTION

The present invention is directed to a system that provides simultaneous viewing of videoconferencing data along with video data from a supplemental video source.

In a first aspect of the invention, a videoconferencing arrangement is provided for simultaneous viewing of videoconferencing data from along with video data from a supplemental video source. The apparatus comprises a codec configured and arranged to provide decompressed video data from a first videoconferencing source; a first analog-to-digital converter, configured and arranged to provide digital video data from a second videoconferencing source; a second analog-to-digital converter, configured and arranged to provide digital video data from the supplemental source; and a video processor coupled to the codec, first converter, and second converter, configured and arranged to receive selection signals and responsive thereto generate composite video data including selected scaled video data overlaid on other selected video data.

In another aspect of the invention, a method is provided for simultaneous viewing of videoconferencing data along with video data from a supplemental video source. The method comprises the steps of digitizing video data from a first videoconferencing source; decompressing video data from a second videoconferencing source; digitizing video data from the supplemental source; scaling video data from the second videoconferencing source; and responsive to selection signals, generating a composite arrangement of video data including selected scaled video data overlaid on other selected video data.

The above summary of the invention is not intended to describe each disclosed embodiment of the invention. This is the purpose of the figures and the detailed description that follow.

BRIEF DESCRIPTION OF THE DRAWINGS

Other aspects and advantages of the present invention will become apparent upon reading the following detailed description and upon reference to the drawings in which:

FIG. 3 is a block diagram of a controller arrangement according to a first example embodiment of the present invention;

Figure 1:
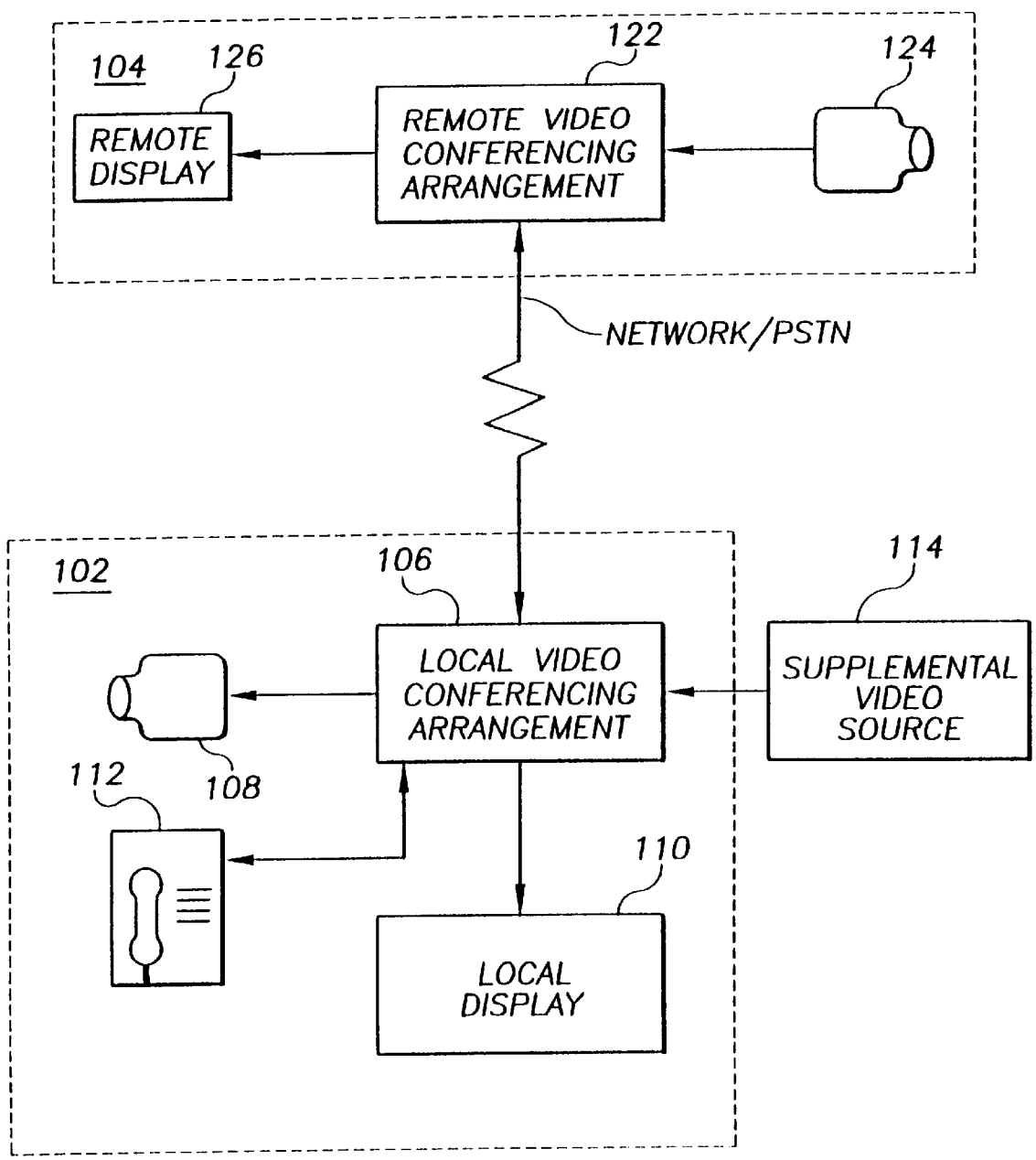
FIG. 1 is a functional block diagram of an example videoconferencing arrangement for use in connection with an embodiment of the present invention.

While the invention is amenable to various modifications and alternative forms, specifics thereof have been shown by way of example in the drawings and will not be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The present invention is believed to be applicable to a variety of systems and arrangements for videoconferencing. The invention has been found to be particularly advantageous in videoconferencing arrangements in which simultaneous viewing of video data from a supplemental video source is desirable. An appreciation of various aspects of the invention is best gained through a discussion of various application examples operating in such environments.

Turning now to FIG. 1, an example videoconferencing system is shown in which videoconferencing is supported between local and remote sites, and the local site supports simultaneous viewing of video data from a supplemental video source. The system includes an example local site 102 and an example remote site 104. The invention accepts multiple video inputs and allows simultaneous viewing of a live video feed, such as broadcast, cable, or direct television, and a scaled view of a videoconferencing call. This allows a user to accept a videophone call and interact in a videoconference without interrupting the supplemental live video feed. Note that "local" and "remote" as used herein refer to relative locations. That is, the remote site is at a location that is different from the local site, and the distance separating the sites may vary from a few to feet to thousands of miles.

Local site 102 includes local videoconferencing arrangement 106, camera 108, local display 110, telephone 112, and supplemental video source 114. In an example embodiment, local videoconferencing arrangement 106 is a set-top box or H.324 terminal. Camera 108 is coupled to local videoconferencing arrangement 106 to provide images of a local scene for a videoconference. Camera 108 may be a conventional video camera, a digital still camera, or alternatively, local videoconferencing arrangement 106 may include an integrated camera. Telephone 112 is coupled to local videoconferencing arrangement 106 for providing user audio input thereto. Alternatively, a hands-free speakerphone may be incorporated in videoconferencing arrangement 106. Telephone 112 also provides a mechanism for user input of control signals to local videoconferencing arrangement 106. In an alternate embodiment, user control signals may be initiated from the keypad of an infrared remote control device, wherein the videoconferencing arrangement 106 includes an infrared receiver reponsive to infrared signals from the infrared remote control device. Local videoconferencing arrangement 106 is coupled to local display 110 for output of video and audio data, and local display 110 is, for example, a conventional television or monitor.

Local videoconferencing arrangement 106 also accepts video input from supplemental video source 114. Supplemental video source 114 is, for example, a broadcast television source, a cable television source, or a direct television source. Under user control from telephone 112, for example, videoconferencing data from remote site 104 and live video data from supplemental video source 114 are selectively and simultaneously displayed on local display 110 by local videoconferencing arrangement 106. In an alternative embodiment, local videoconferencing arrangement 106 includes an integrated telephone and/or other control mechanisms for establishing a videoconference with a remote site 104 and simultaneously displaying live video data from supplemental video source 114.

Local videoconferencing arrangement 106 is coupled to remote videoconferencing arrangement 122 via a network or PSTN. Note that a network may be a local area network or a wide area network. Remote videoconferencing arrangement 122 is coupled to camera 124 to receive video images of a remote scene for a videoconference. Remote videoconferencing arrangement 122 outputs videoconferencing data to remote display 126. A simplified version of remote videoconferencing site 104 is presented in the interest of brevity.

Figure 2A:
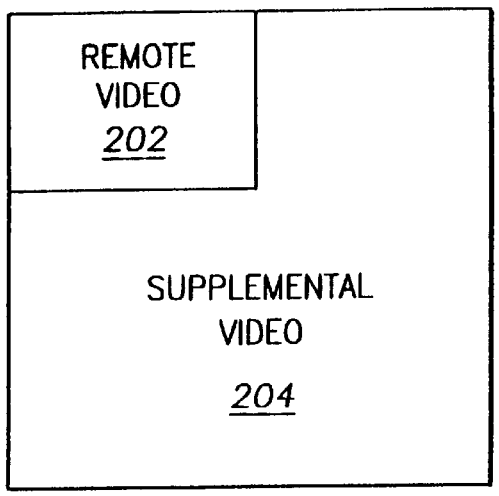
FIGS. 2A, 2B, 2C, 2D, and 2E illustrate example viewing arrangements of video data from first and second videoconferencing sources and video data from a supplemental video source.
Figure 2B:
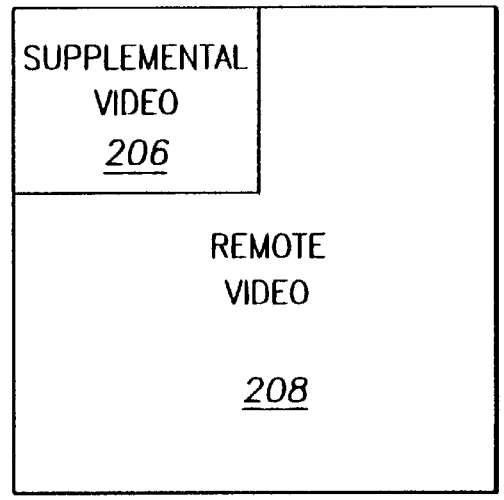

FIGS. 2A–E illustrate example composite arrangements of videoconferencing data along with data from a supplemental video source. While the specific relative locations within a display of local and remote videoconferencing data and supplemental video data are shown, the invention is not limited to the specifically illustrated examples. Rather, the invention supports display of various user-selected combinations of local and remote videoconferencing data and supplemental video data at any user-selected locations within a display screen. The example arrangements are displayed via local display 110, for example. In FIG. 2A, video data 202 from remote videoconferencing site 104 is displayed in the upper left-hand corner of the screen of local display 110, for example. The remainder of the screen is filled with video data 204 from supplemental video source 114. The arrangement of video data presented in FIG. 2B is opposite that of the arrangement of FIG. 2A. Specifically, supplemental video data 206 is displayed in the upper left-hand corner of the screen, and remote video data 208 is displayed in the remainder of the screen. Note that the video data arrangement of FIG. 2B requires scaling of the supplemental video data. Therefore, contemplated is a memory for storage of a line or frame of the supplemental video data prior to its being scaled.

Figure 2C:
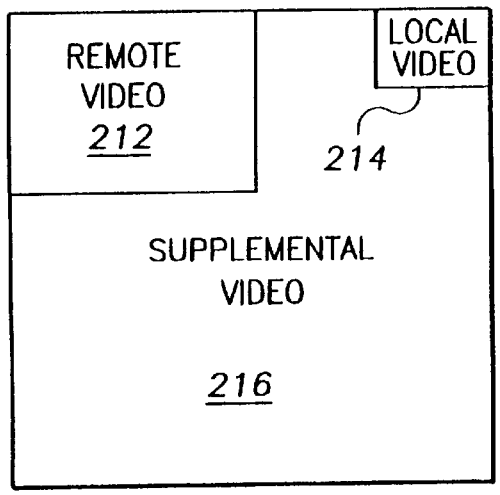
Figure 5:
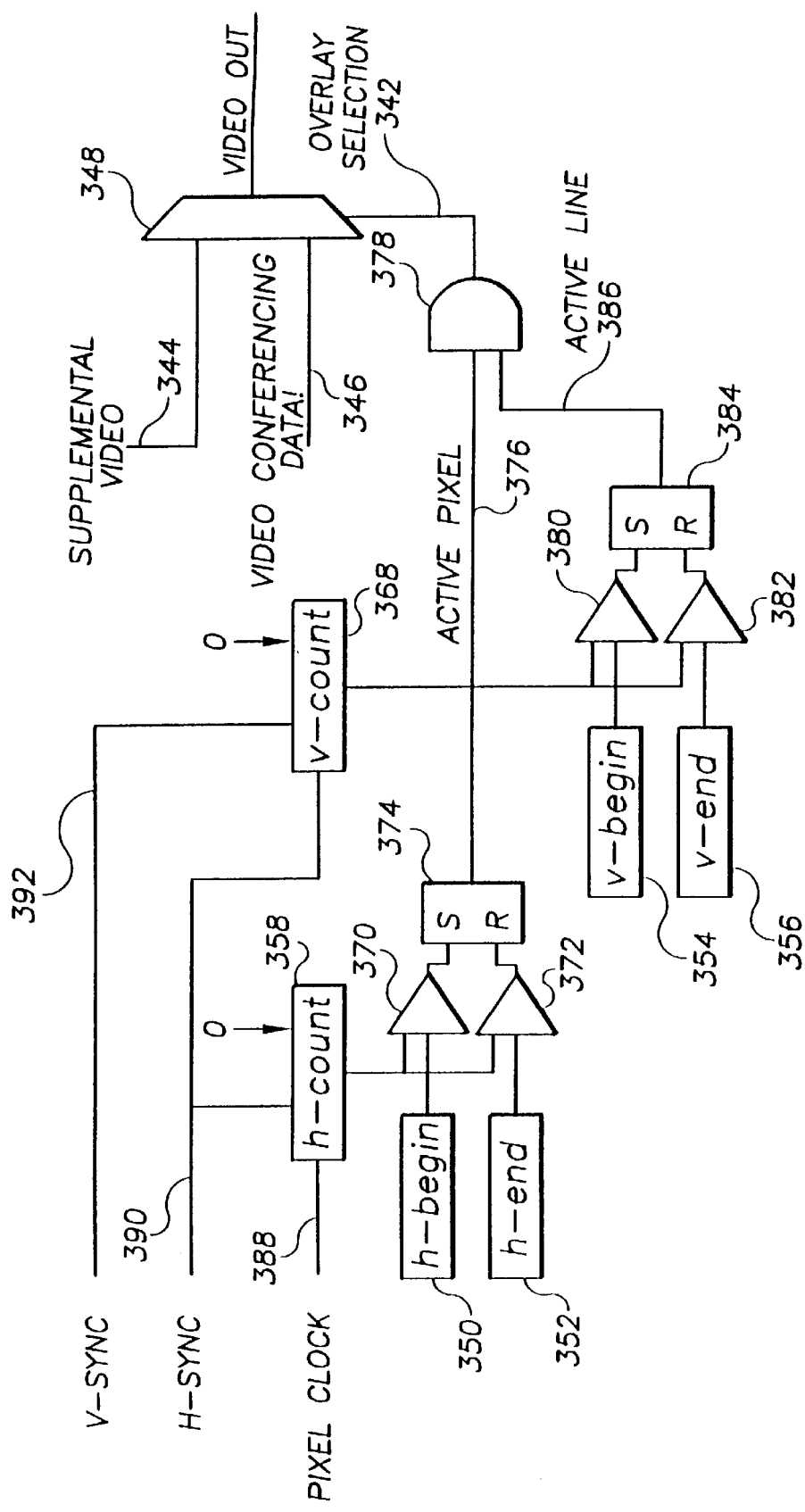
FIG. 5 is an example logic circuit for generating the screen of video data illustrated in FIG. 4A.

FIG. 2C illustrates a composite arrangement of video data from local and remote sites in a videoconference, along with video data from a supplemental video source 114. Videoconferencing data 212 from a remote site 104 is displayed in the upper left-hand corner of a screen of local display 110, videoconferencing data 214 from a local site 102 is displayed in the upper right-hand corner of the screen, and video data 216 from supplemental video source 114 is displayed in the remainder of the screen. Note that the video data arrangement of FIG. 2C illustrates a double overlay of video data. That is, the remote and local video data are in separate portions of the screen. Thus, additional selection circuitry that is similar to that illustrated in FIG. 5 is contemplated to implement the video data arrangement of FIG. 2C.

Figure 2D:
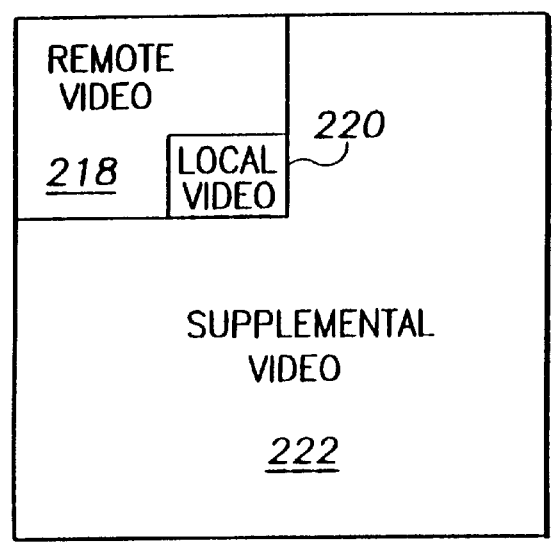
Figure 2E:
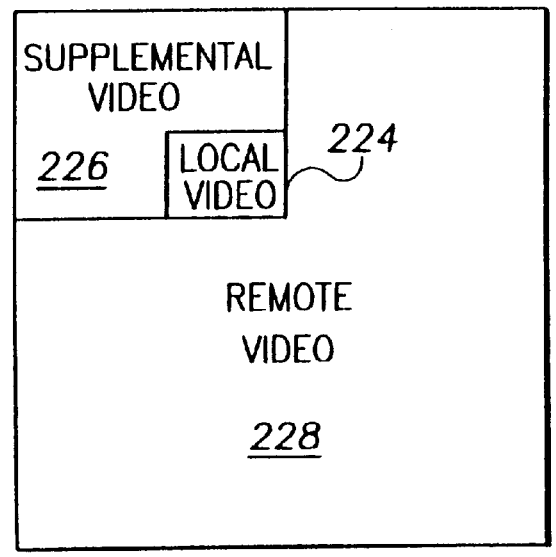

FIG. 2D illustrates an alternate arrangement of the video data described in FIG. 2C. Specifically, remote videoconferencing data 218 is displayed in the upper left-hand corner of the screen, local videoconferencing data 220 is displayed in the lower right-hand corner of the portion of the screen allocated to the remote videoconferencing data, and the supplemental video data 222 from supplemental video source 114 is displayed in the remainder of the screen. FIG. 2E shows yet another alternate arrangement of local and remote videoconferencing data 224, 226 along with supplemental video data 228. Note that the video data arrangement of FIG. 2E requires scaling of the supplemental video data. Therefore, contemplated is memory for storage of a line/frame of the supplemental video data prior to its being scaled.

FIG. 3 is a block diagram of an example embodiment of a videoconferencing arrangement in accordance with the present invention. The videoconferencing arrangement includes a video processor 302 that is configured to receive digital video signals from a plurality of sources and scale and overlay images from the sources in response to selection signals input on line 304. The video processor may be implemented with one or more special purpose microprocessors or one or more ASICs.

Video data from a remote videoconferencing site is input to network interface element 306 and then to AV codec element 308. AV codec element 308 decompresses remote videoconferencing data and provides the decompressed remote videoconferencing data to line/frame memory 312.

Local videoconferencing data is input to analog-to-digital converter 310. Converter 310 is arranged to receive analog NTSC signals and generate digital video signals. Converter 310 is coupled to line/frame memory element 312, whereby the local videoconferencing data is stored in line/frame memory element 312 and also provided as input to video processor 302. Local videoconferencing data is read from line/frame memory 312 by AV codec 308 and compressed before being output to the remote videoconferencing site via network interface 306.

NTSC video data from a supplemental video source is input to converter 316. Converter 316 is coupled to video processor 302, and from analog NTSC video signals generates digital video signals. Video processor 302 receives the supplemental video data from converter 316, local videoconferencing data from converter 310, and remote videoconferencing data from codec 308, and generates a composite arrangement of video data in response to selection signals input via line 304. In an example embodiment, the selection signals are user-specified via a graphical user interface, where the selection signals indicate the desired combination of video data to be displayed, the desired scaling of the selected video data, and the desired locations of the video data.

Video processor 302 generates a composite arrangement of video data by scaling selected data and replacing one or more portions of other selected video data with the scaled video data. The scaling of images is implemented in hardware as multi-tap, multi-bank scaling filters to provide either decimation (scale down) or interpolation (scale up) and on-the-fly changes. In another embodiment, several sets of filter banks are used for the various scaling requirements of the normal sized image and the overlay image. The selection of the filter bank and the scaling factor is performed on-the-fly as a function of horizontal pixel position within a line. The composite arrangement of video data, including selected and scaled videoconferencing data and supplemental video data, is output to converter element 318. Converter element 318 converts digital video signals to analog NTSC signals. The analog video signals are then output to the local display.

In an example embodiment, converter elements 310, 316, and 318, network interface 306, codec 308, and memory 312 include conventional circuitry and/or microprocessor(s) programmed accordingly.

Figure 4A:
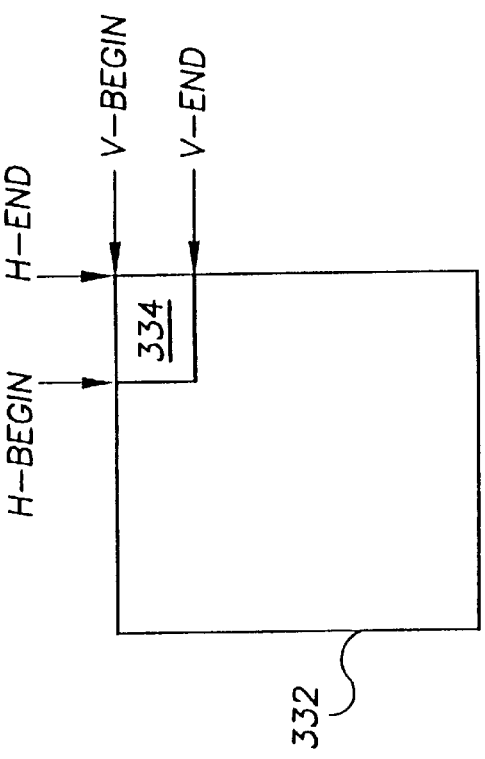
FIG. 4A illustrates a screen of video data that includes an overlay portion.

FIG. 4A illustrates an example display screen 332 having overlaid video data 334. Four example control codes are used to generate the screen of video data. The four example control codes include, H_begin, H_end, V_begin, V_end. The control code, H_begin, is used to indicate the relative horizontal pixel position within screen 332 at which overlay video data is to be included. Control code H_end, is used to indicate the relative horizontal pixel position within screen 332 at which overlaid video data ends. Analogously, the control code, V_begin, is used to indicate the relative vertical pixel position within screen 332 at which overlay video data is to be included, and V_end indicates the relative vertical pixel location of the display screen 332 at which overlay video data ends. Therefore, the four control codes indicate the boundaries of overlay video data 334 within screen 332.

Figure 4B:
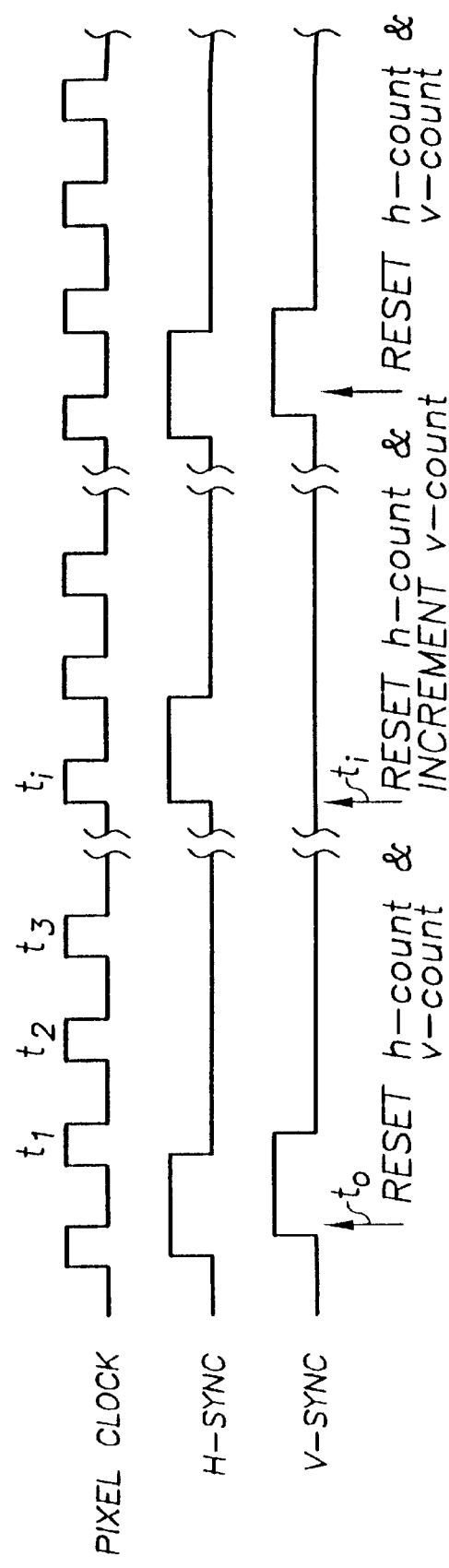
FIG. 4B is a timing diagram that illustrates the relationships between signals used to generate the screen of data illustrated in FIG. 4A.

The general processing for generating screen 332 having overlay video data is as follows:

Always at (positive edge of the pixel clock) begin
   If (H_sync)
      H_count=0;
   else
      H_count=H_count+1;
End
Always at (positive edge of H_sync) begin
   if (V_sync)
      V_count=0;
   else
      V_count=V_count+1;
Select overlay video data when (H_count>H_begin)&(H_count<H_end)&(V_count>V_begin)&(V_count<V_end);

The timing diagram of FIG. 4B illustrates the processing set forth above for generating overlay video data. The pixel clock signal indicates arrival of a pixel of data for processing. The H_sync signal indicates the beginning of a line of pixel data for processing. Therefore, at the positive of the pixel clock if H_sync is active, H_count is set to zero to indicate the beginning of processing of pixels for a line of video data. The V_sync clock signal is generated when the last pixel in the last row of video data has been processed. In the example at time $t_0$, H_count and V_count are reset to zero. At times $t_1$, $t_2$, and $t_3$, H_count is incremented. At time $t_1$, H_count is reset. Thus, when H_count is between H_begin and H_end and V_count is between V_begin and V_end, the overlay video data is selected for output. When H_count and V_count are outside the ranges of H_begin and H_end and V_begin and V_end the video overlay data is not selected.

FIG. 5 illustrates a logic circuit that implements the control for overlaying video data as described in FIGS. 4A and 4B. An overlay selection signal is generated on line 342 for selecting either supplemental video data of line 344 or videoconferencing data of line 346 at selector 348. As described above, when the pixel in process is between H_begin and H_end and between V_begin and V_end, videoconferencing data is selected for output.

The variables H_begin, H_end, V_begin, and V_end are stored in registers 350, 352, 354, and 356, respectively. The pixel in process is designated by H_count and V_count as stored in registers 358 and 360, respectively. At comparitors 370 and 372, H_count is compared to H_begin and H_end. Flip-flop 374 is set when H_count is greater than H_begin and less than H_end, and an active pixel signal is provided as input on line 376 to and gate 378. Comparitors 380 and 382, along with flip-flop 384 provide the analogous function relative to V_count. When both the active pixel signal on line 376 and the active line signal on line 386 are active, AND gate 378 activates overlay selection signal 342 and the videoconferencing data on line 346 is selected by selector 348.

The H_count register 358 is responsive to the pixel clock signal provided on line 388 and the H_sync signal provided on line 390. At the positive edge of the pixel clock signal, if the H_sync signal is active, H_count is set to zero.

Otherwise, H_count is incremented by one. The V_count register 368 is responsive to the H_sync signal and to the V_sync signal on line 392. At the positive edge of the H_sync signal, if the V_sync signal is active, V_count is set to zero. Otherwise, V_count is incremented by one.

Figure 6:
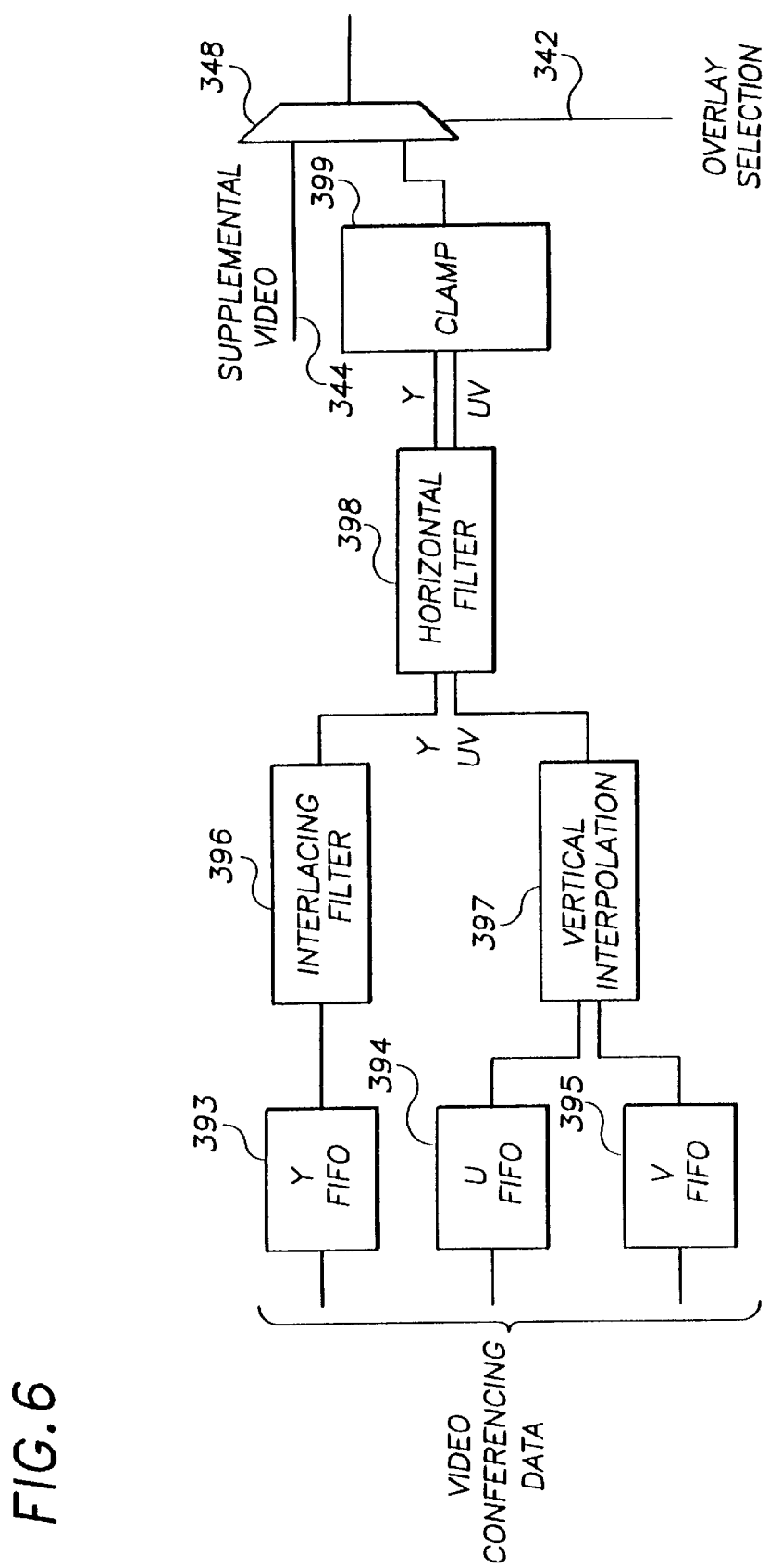
FIG. 6 is a functional block diagram of a circuit arrangement for generating videoconferencing data in accordance with the present invention.

FIG. 6 is a functional block diagram of a circuit arrangement that scales videoconferencing data. Y, U, and V videoconferencing data is buffered in FIFOs 393, 394, and 395, respectively. Videoconferencing data from Y-FIFO 393 is input to interlacing filter 396, and U and V videoconferencing data is input to block 397 for vertical interpolation. Horizontal filter block 398 scales the Y and UV videoconferencing data, and Y and UV videoconferencing codes are provided as input to clamp 399 which restricts the Y and UV codes to certain predetermined values. The scaled videoconferencing data is then provided as input to selector 348.

Note that the arrangement of FIG. 6 scales videoconferencing data but not the supplemental video data. An additional arrangement similar to that shown in FIG. 6 may be utilized to selectively scale the supplemental video data.

Figure 7:
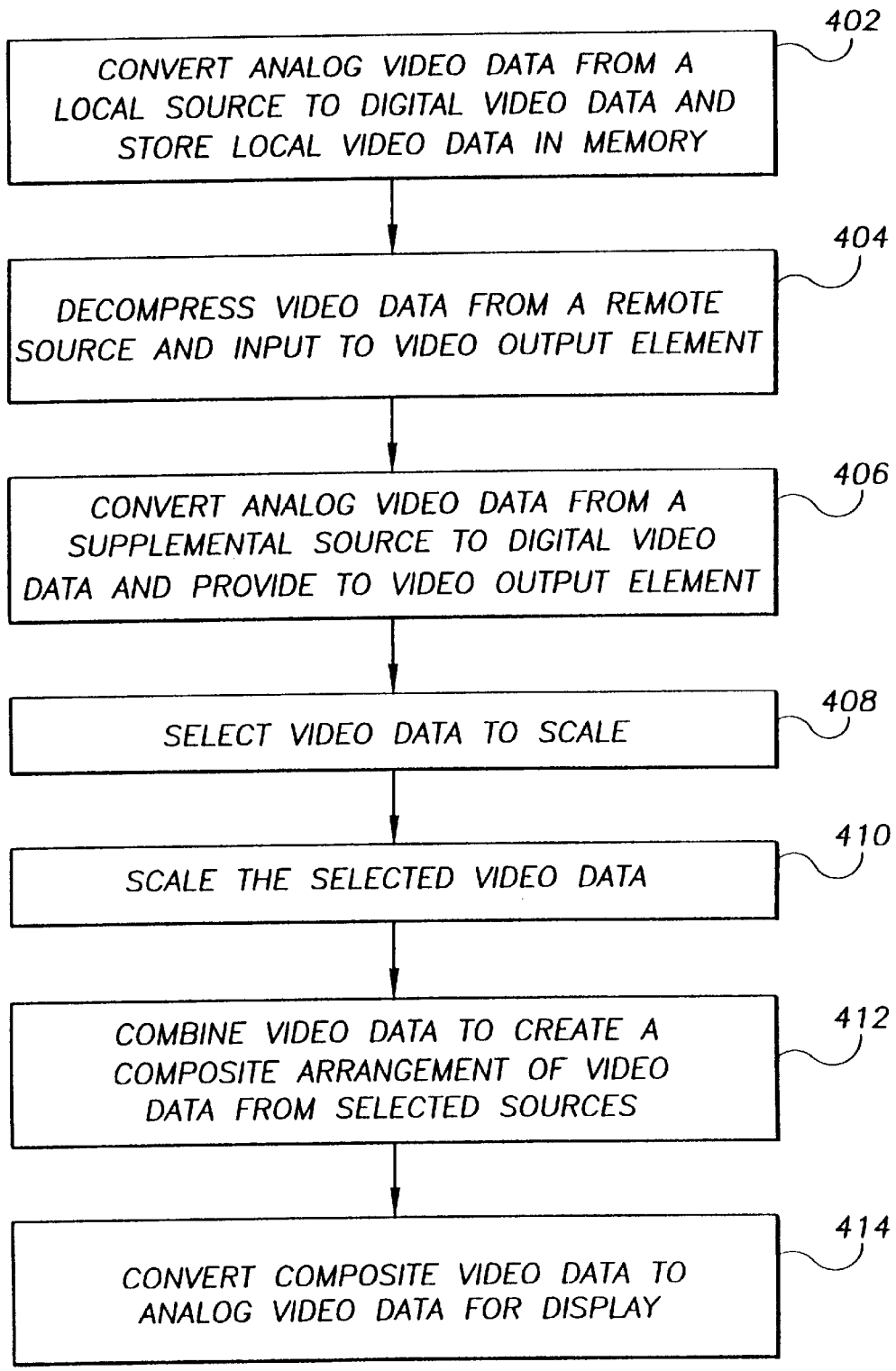
FIG. 7 is flowchart of an example method for videoconferencing and viewing video data from a supplemental video source according to the embodiment of FIG. 3.

FIG. 7 is a flowchart of an example method for simultaneously displaying videoconferencing data and video data from a supplemental source in accordance with the embodiments of the invention as described in FIG. 3. As shown by block 402, videoconferencing data from a local source is converted from analog NTSC video data to digital video data and stored in a local video data memory. The local video data is temporarily stored so that it can be compressed prior to transmission to a remote site involved in a videoconference. Videoconferencing data from a remote source is decompressed at block 404, and provided as input to a video processor. At block 406, analog video data from a supplemental source is converted to digital video data and provided as input to video processor, 302 for example.

At block 408, video data is selected for scaling. As indicated in the discussion accompanying FIGS. 2A–E, various combinations of local and remote videoconferencing data and supplemental video data are selectable for scaling. The particular video data selected for scaling is dictated by the desired composite arrangement of video data, as exemplified in FIGS. 2A–E. After the selected video data has been scaled at block 410, the selected video data is combined at block 412 to generate a composite arrangement as illustrated in FIGS. 2A–E. At block 414, the composite arrangement of video data is converted from digital video data to analog video signals for output to a local display.

Figure 8:
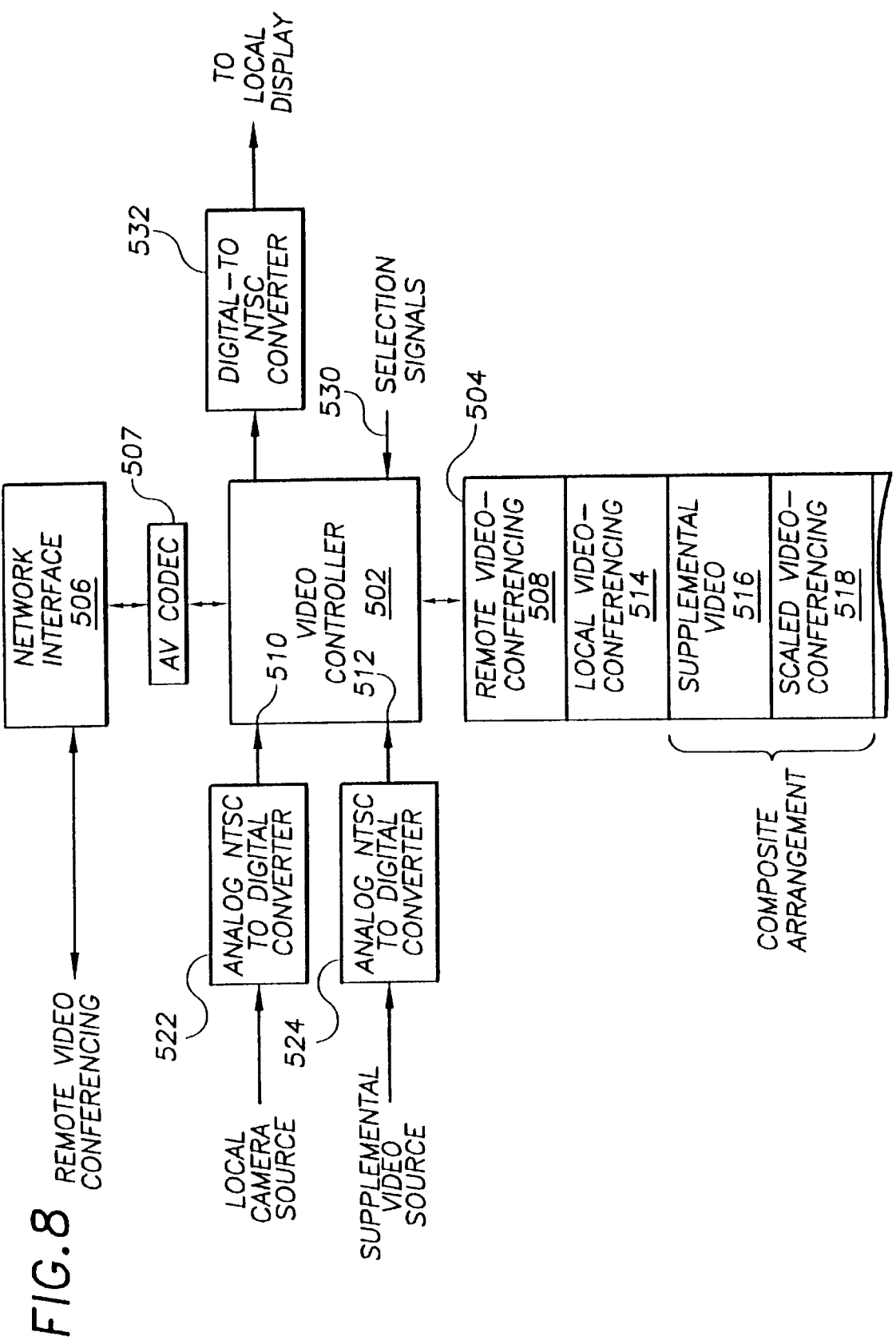
FIG. 8 is a block diagram of a controller arrangement according to a second embodiment of the present invention.

FIG. 8 is a block diagram of another example embodiment of a videoconferencing arrangement in accordance with the present invention. The videoconferencing arrangement includes controller 502 coupled to memory 504. Controller 502 is coupled to network interface 506 via AV codec 507, where network interface 506 controls communications with a remote videoconferencing site. Controller 502 receives videoconferencing data from a remote site via network interface 506 and, after AV codec 507 decompresses the remote video data, stores the remote video data in memory 504 as illustrated by block 508. Input ports 510 and 512 are included in controller 502 to receive digital video data from a local camera source and from a supplemental video source, respectively. Digital local videoconferencing data received by controller 502 is stored in memory 504, as illustrated by block 514, and digital supplemental video data received by controller 502 is stored in memory 504, as shown by block 516. Converters 522 and 524 provide digital local videoconferencing data and supplemental video data, respectively.

Controller 502, in response to selection signals on line 530, generates a composite arrangement of video data, for example, by scaling selected videoconferencing data and replacing a portion of the supplemental video data 516 in memory 504 with the scaled videoconferencing data, as illustrated by block 518. The composite arrangement of video data, including both supplemental video data 516 and scaled videoconferencing data 518 are read from memory 504 and output to a local display 110 via converter 532. Converter 532 converts the composite digital video data from controller 502 to analog NTSC video signals, for example. It will be understood that the example composite arrangements illustrated in FIGS. 2A–E are all possible with the circuit arrangement of FIG. 5.

Figure 9:
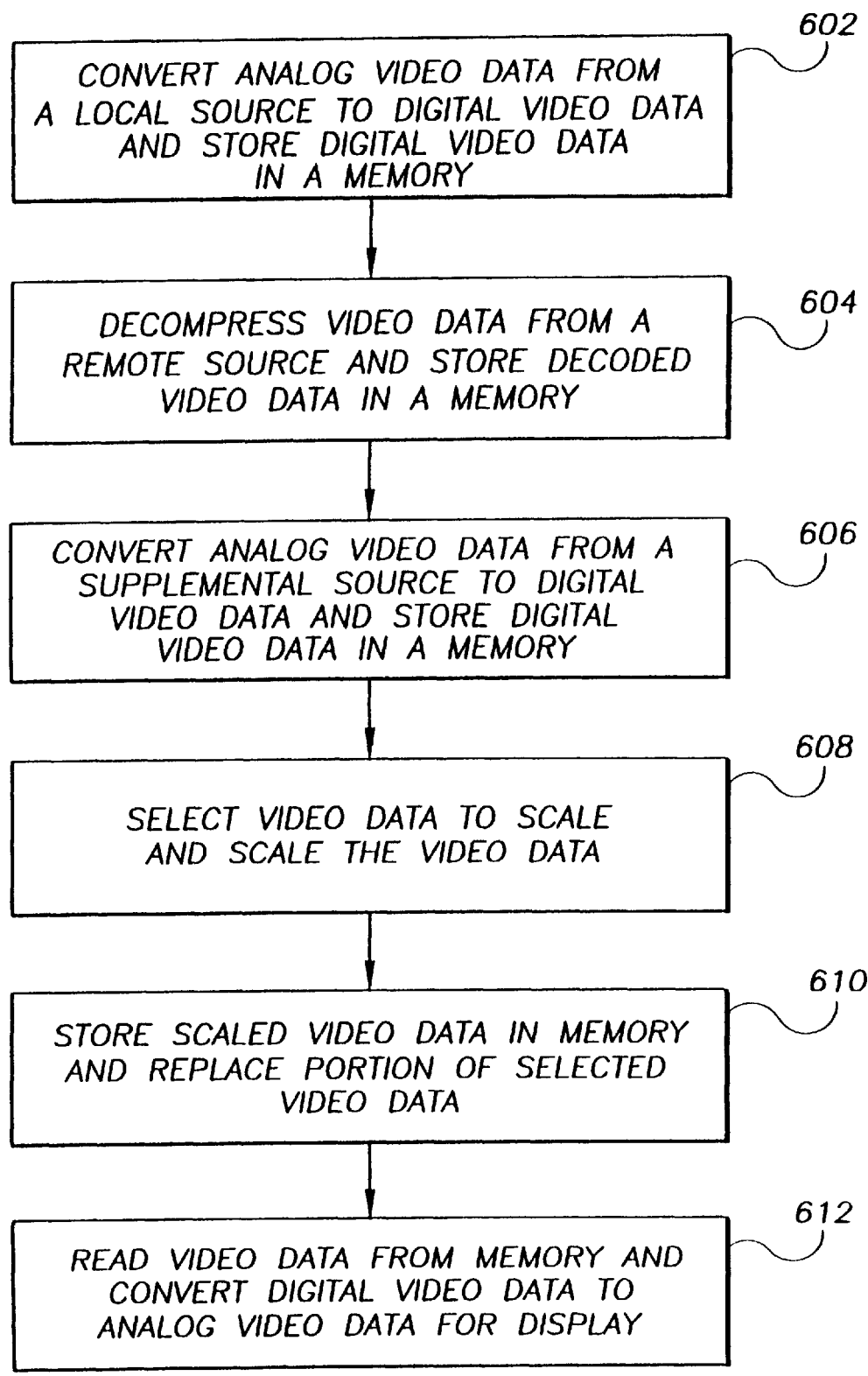
FIG. 9 is a flowchart of an example method for videoconferencing and viewing video data from a supplemental video source according to the embodiment of FIG. 8.

FIG. 9 is a flowchart of an example method for simultaneously displaying videoconferencing data and video data from a supplemental source in accordance with the embodiments of the invention as described in FIG. 5. As shown by blocks 602, 604, and 606, video signals from a local source are converted from analog to digital video data and stored in a memory, videoconferencing data from a remote source are decompressed and stored in a memory, and video signals from a supplemental source are converted to digital video data and stored in a memory, respectively.

At block 608, video data is selected for scaling. The particular video data selected for scaling is dictated by the desired composite arrangement of video data. FIGS. 2A–E illustrate various example composite arrangements of video data, wherein various combinations of remote videoconferencing data, local videoconferencing data, and supplemental video data have been scaled. After the selected video data has been scaled, the scaled video data is stored in a memory 504, for example, at a location such that a portion of video data from another source is overlaid with the scaled video data, as shown by block 610. The processing of blocks 608 and 610 is repeated for each set of video data desired to be scaled. At block 612, the composite video data created at block 610 is read from memory and converted from digital video data to analog video signals for display.

It will be understood that the processor-based circuit arrangements of FIGS. 3 and 5 can be implemented using any of a variety of processor arrangements, including the arrangements of those disclosed in U.S. patent application Ser. Nos. 08/692,993 and 08/658,917, respectively entitled and relating to issued patents also entitled "Programmable Architecture and Methods for Motion Estimation" (U.S. Pat. No. 5,594,813) and "Video Compression and Decompression Processing and Processors" (U.S. Pat. No. 5,379,351). These applications and issued patents are incorporated herein by reference.

As other example implementations, the videoconferencing arrangement is configured as a ViaTV product available from 8×8, Inc. (modified as needed to connect directly to a supplemental video source) and as a set-top box with the features of a VC55-type ViaTV Phone arrangement and with a keypad control console, such as a keypad. The features of the VC55 are described in the attached appendix, which is incorporated herein by reference.

Figure 10:
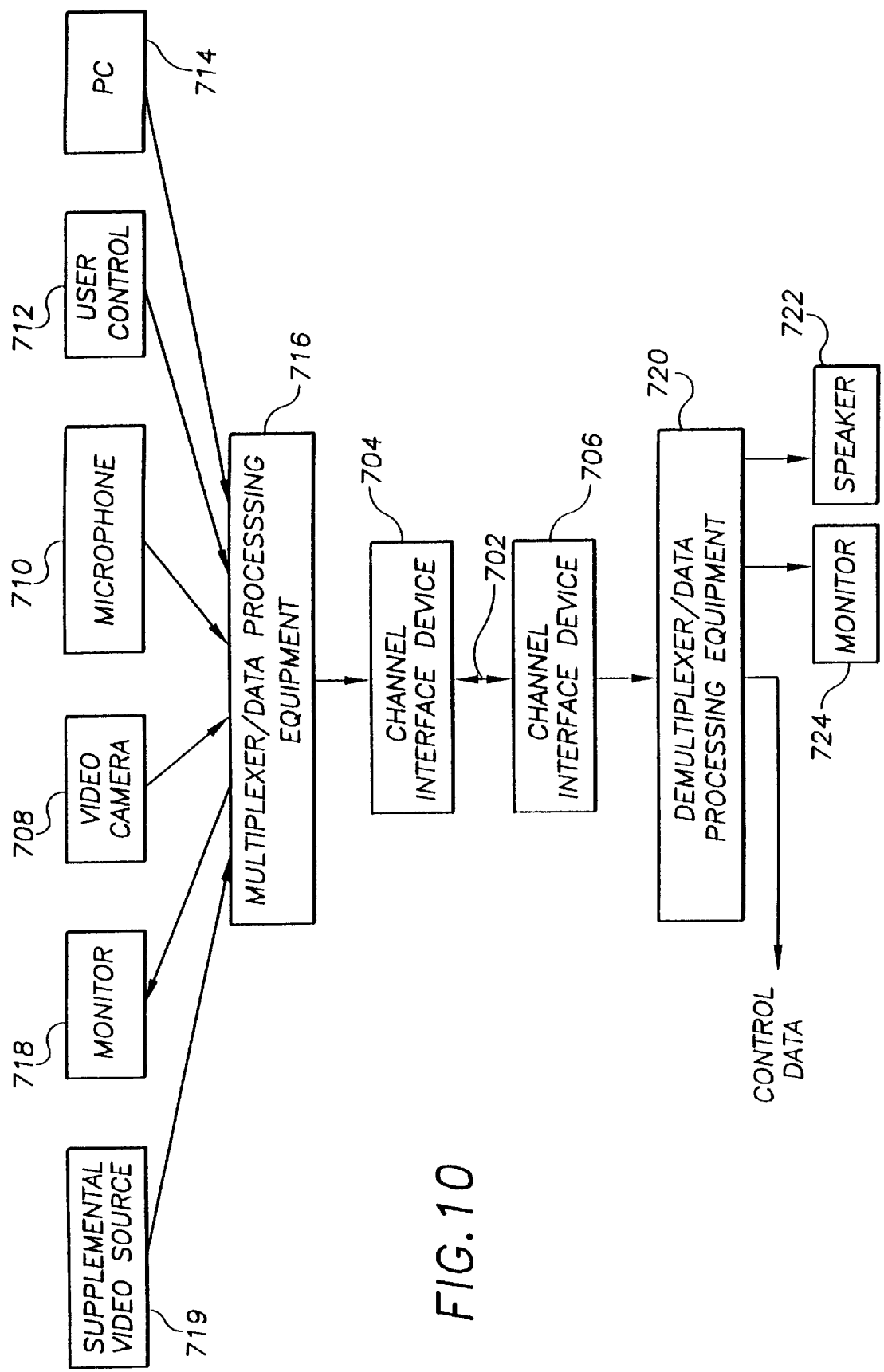
FIG. 10 is a block diagram of an example data processing system for a videoconferencing application.

FIG. 10 is a block diagram of an example data processing system for a videoconferencing application. The system includes data sending equipment depicted above communication channel 702 and data receiving equipment depicted below communication channel 702. While the sending and receiving of such data is often reciprocal in many data processing applications of this type as with the instant videoconferencing illustration, the configuration illustrated in FIG. 7 is simplified in this regard to facilitate the discussion.

At the sending end of the system of FIG. 7, a transmitting channel interface device 704 is used to send processed data over the communication channel 702 to the receiving channel interface device 706. The data that is presented to the channel interface device 704 is collected from various types of data sources including, for example, a video camera 708, a microphone 710, a user control device 712, and a conventional personal computer 714. The data sources typically use buffers to store the data to be collected. The data collected from each of these data sources is received by multiplexer/data processing equipment (MDPE) 716. MDPE 716 monitors the available channel bandwidth and, based on its capacity to transmit additional data, collects and formats the data collected from each of the input sources so as to maximize the amount of data to be transmitted over the channel 702. A monitor 718 is optionally used with the video camera 708 to monitor the manner in which video images are captured by the video camera 708.

Supplemental video source 719 provides a live video feed, such as broadcast, cable, or direct television as input to MDPE 716. MDPE 716 generates a composite arrangement of video data from supplemental video source 719, video camera 708, and video data from a remote site (not shown). Thus, for example, a scaled view of a videoconferencing call is available for display at the same time that a television program is displayed on monitor 718.

At the lower end of the system of FIG. 10, the formatted data communicated over the channel 702 is received by the channel interface device 706, which then presents the received data to demultiplexer/data processing equipment (DDPE) 720. DDPE 720 is set up to sort out the formatted data received over the channel 702 according to instructions previously sent by the MDPE 716. The demultiplexed data is then presented to the appropriate output source equipment, including audio data to a speaker 722, video data to a monitor 724, and control data to external equipment for subsequent processing.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A videoconferencing arrangement for simultaneous viewing of videoconferencing data along with video data from a supplemental video source, comprising:

a codec configured and arranged to provide decompressed videoconferencing data from a first source;

a first analog-to-digital converter, configured and arranged to provide digital videoconferencing data from a second source;

a second analog-to-digital converter, configured and arranged to provide digital video data from the supplemental source;

a video processor coupled to the codec, first converter, and second converter, the video processor configured and arranged to receive selection signals and responsive thereto, generate composite video data including selected scaled video data from the first source and second source overlaid on video data from the supplemental source;

a selector coupled to the codec the first converter and responsive to the selection signals, and arranged to output selected video data in response to the selection signals;

a first register arranged for storage of a value indicative of a horizontal screen position at which display of scaled video data begins;

a second register arranged for storage of a value indicative of a horizontal screen position at which display of scaled video data ends;

a third register arranged for storage of a value indicative of a vertical screen position at which display of scaled video data begins;

a second register arranged for storage of a value indicative of a vertical screen position at which display of scaled video data ends; and means coupled to the first, second, third, and fourth registers for generating the selection signals responsive to values in the registers and a present pixel position.

2. The arrangement of claim 1, further comprising a digital-to-analog converter coupled to the video processor and arranged to provide analog video signals.

3. The arrangement of claim 1, wherein the video processor is directly coupled to the second converter.

4. The arrangement of claim 1, wherein the codec includes a DSP circuit for compression and decompression of video data.

5. The arrangement of claim 4, wherein the video processor includes a general purpose processor circuit.

6. A videoconferencing arrangement for simultaneous viewing of videoconferencing data along with video data from a supplemental video source, comprising:

a codec configured and arranged to provide decompressed videoconferencing data from a first source;

a first analog-to-digital converter, configured and arranged to provide digital videoconferencing data from a second source;

a second analog-to-digital converter, configured and arranged to provide digital video data from the supplemental source; and a video processor coupled to the codec, first converter, and second converter, configured and arranged to receive selection signals and responsive thereto, generate composite video data including selected scaled video data overlaid on other selected video data;

a selector coupled to the codec, the first converter and responsive to the selection signals, and arranged to output selected video data in response to the selection signals;

a first register arranged for storage of a value indicative of a horizontal screen position at which display of scaled video data begins;

a second register arranged for storage of a value indicative of a horizontal screen position at which display of scaled video data ends;

a third register arranged for storage of a value indicative of a vertical screen position at which display of scaled video data begins;

a fourth register arranged for storage of a value indicative of a vertical screen position at which display of scaled video data ends;

means coupled to the first, second, third, and fourth registers for generating the selection signals responsive to values in the registers and a present pixel position.

* * * * *